United States Patent
Gratton et al.

(10) Patent No.: US 10,320,803 B2
(45) Date of Patent: Jun. 11, 2019

(54) DETERMINING ELIGIBILITY FOR MULTIPLE CLIENT MEDIA STREAMING

(71) Applicants: Dish Technologies L.L.C., Englewood, CO (US); Hughes Network Systems, LLC, Germantown, MD (US)

(72) Inventors: Max S. Gratton, Lakewood, CO (US); Timothy Robert Jezek, Vienna, VA (US)

(73) Assignees: DISH TECHNOLOGIES LLC, Englewood, CO (US); HUGHES NETWORK SYSTEMS, LLC, Germantown, MD (US)

( * ) Notice: Subject to any disclaimer, the term of this patent is extended or adjusted under 35 U.S.C. 154(b) by 245 days.

(21) Appl. No.: 13/827,839

(22) Filed: Mar. 14, 2013

(65) Prior Publication Data

US 2014/0189067 A1    Jul. 3, 2014

Related U.S. Application Data

(60) Provisional application No. 61/747,095, filed on Dec. 28, 2012.

(51) Int. Cl.
  *G06F 21/10* (2013.01)
  *H04L 29/06* (2006.01)

(52) U.S. Cl.
  CPC .......... *H04L 63/107* (2013.01); *G06F 21/10* (2013.01); *H04L 63/0815* (2013.01); *H04L 63/20* (2013.01); *H04L 65/4084* (2013.01); *H04L 65/60* (2013.01)

(58) Field of Classification Search
  CPC combination set(s) only.
  See application file for complete search history.

(56) References Cited

U.S. PATENT DOCUMENTS

| | | | |
|---|---|---|---|
| 2007/0208934 A1* | 9/2007 | Heffez | H04L 63/107 713/161 |
| 2007/0213049 A1* | 9/2007 | Bishop | 455/432.3 |
| 2008/0059409 A1* | 3/2008 | Montpetit | 707/2 |
| 2010/0122303 A1 | 5/2010 | Maloney | |
| 2010/0151816 A1* | 6/2010 | Besehanic | G06Q 30/02 455/405 |
| 2012/0124612 A1* | 5/2012 | Adimatyam et al. | 725/27 |
| 2012/0127263 A1 | 5/2012 | Ogle et al. | |
| 2012/0202459 A1* | 8/2012 | Martell | H04L 63/083 455/410 |
| 2012/0258740 A1* | 10/2012 | Mildh | H04L 63/107 455/456.4 |
| 2013/0152221 A1* | 6/2013 | Yin et al. | 726/31 |

(Continued)

OTHER PUBLICATIONS

European Patent Office, Extended European Search Report for Patent Application No. 13198982.4-1870 dated May 31, 2017.

*Primary Examiner* — Chris Parry
*Assistant Examiner* — Caroline H Jahnige
(74) *Attorney, Agent, or Firm* — Lorenz & Kopf LLP

(57) ABSTRACT

Methods, systems and devices to authorize access to a simultaneous media streams are described. After a first media stream is initiated with a first client device, an authorization service receives a request to establish the simultaneous second media stream with a second client device. The service determines whether the second client device is at a geographic location where simultaneous streaming is allowed, and grants or denies access to the second simultaneous stream accordingly.

12 Claims, 3 Drawing Sheets

(56) References Cited

U.S. PATENT DOCUMENTS

Figure 1:
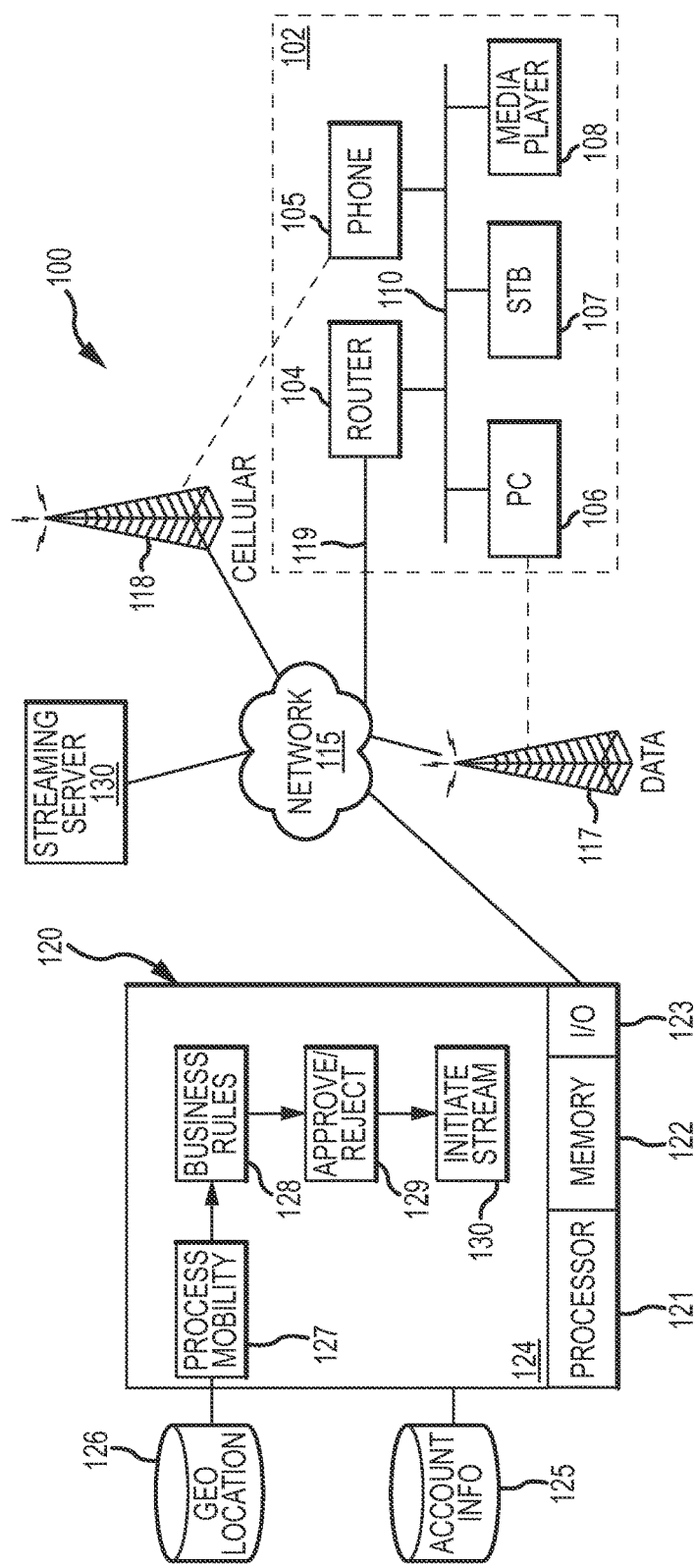

2013/0326041 A1\* 12/2013 Bellet et al. .................. 709/223
2014/0026160 A1\* 1/2014 Shrum, Jr. ....... H04N 21/25841
                                                                                        725/25

\* cited by examiner

DETERMINING ELIGIBILITY FOR MULTIPLE CLIENT MEDIA STREAMING

CROSS-REFERENCES TO RELATED APPLICATIONS

This Application claims priority to U.S. Provisional Application No. 61/747,095, filed Dec. 28, 2012.

TECHNICAL FIELD

The present disclosure generally relates to streaming media. More particularly, the following discussion relates to systems, methods and devices to determine eligibility to receive multiple simultaneous media streams.

BACKGROUND

Media streaming is becoming an increasingly popular way of delivering television, movies and other media content to viewers. Media streams are typically point-to-point transmissions of digitized content that can be sent over the Internet or a similar network. Media streaming is often used to facilitate video on demand (VOD), remote storage digital video recorder (RSDVR), placeshifted media viewing and/or any number of other convenient services. Generally, the media stream is played back for the viewer in real time as the stream continues to be delivered to the player.

Media streaming is often favored over other types of content delivery because of its versatility. Unlike traditional television broadcasts, for example, media streams can often be sent to many different types of devices such as mobile phones, set top boxes and other television receivers, personal computers, tablet computers, video game players and the like. Streaming media often allows media content to be delivered at any time and to any place that network connectivity is available, thereby allowing a high level of flexibility.

The increased flexibility, however, can create challenges in controlling the distribution of media content while protecting the intellectual property rights of media content owners. Often, media content owners are reluctant to allow streaming of their valuable media content unless they can be assured that the streamed content will not be improperly duplicated or used for other undesired purposes. This can be a particular challenge if viewers are allowed to receive multiple simultaneous streams. While some video streaming services simply limit each user to a single stream at any particular time, this restriction is becoming unduly burdensome, especially as mobile phones, tablet computers and other devices that are capable of media playback become more widespread.

It is therefore desirable to build systems, devices and techniques for determining whether a user device is eligible to receive a media stream, particularly if the same user is currently receiving a different media stream using a different device. These and other desirable features and characteristics will become apparent from the subsequent detailed description and the appended claims, taken in conjunction with the accompanying drawings and this background section.

BRIEF SUMMARY

Several examples of systems, devices and methods are described for determining eligibility to receive multiple simultaneous media streams based upon geographic or mobility information about the player device. According to various embodiments, multiple simultaneous media streams can be allowed to devices that are located in the same geographic vicinity while disallowing or limiting streams to devices in other locations. This allows, for example, multiple streams into a single home, office or other environment while still limiting streams that may be provided to mobile devices that are traveling to other geographic locations. A user could receive multiple concurrent streams using multiple playback devices within the home, for example, even though streaming is limited to devices located outside of the home. Any number of business rules could be implemented and enforced to allow or disallow streaming as desired.

One exemplary embodiment provides a method to authorize access to a simultaneous second media stream. This method suitably comprises various functions that may be carried out by a network server or other computer system. For example, a request is received at the computer system to establish the simultaneous second media stream with a second client device, wherein the request is received after a first media stream has been initiated with a first client device that is different from the second client device. The computer system determines whether the second client device is located at a geographic location where simultaneous streaming is allowed. If the second client device is located at the geographic location where simultaneous streaming is allowed, the computer system grants the second client device access to the simultaneous second media stream and otherwise denies the second client device access to the simultaneous second media stream.

Another exemplary embodiment provides a computer system to authorize access to a simultaneous second media stream with a second client device after a first media stream has been established with a first client device. The computer system suitably comprises an interface to a network and a processor. The processor is configured to receive a request to establish the simultaneous second media stream with the second client device, to determine whether the second client device is located at a geographic location where simultaneous streaming is allowed, and, if the second client device is located at the geographic location where simultaneous streaming is allowed, to grant the second client device access to the simultaneous second media stream and to otherwise deny the second client device access to the simultaneous second media stream.

Still another exemplary embodiment provides a method executable by a computer system to authorize access to simultaneous media streams by a user. This method suitably comprises receiving a first request to establish a first media stream with a first client device associated with the user; authorizing the first media connection with the first client device; after authorizing the first media connection, receiving a second request to establish a simultaneous second media stream with a second client device associated with the user; determining if the second media stream with the second client device is authorized based upon mobility information about the second client device; and, if the simultaneous second media stream is authorized, granting the second client device access to the simultaneous second media stream and otherwise denying the second client device access to the simultaneous second media stream.

Alternate embodiments, aspects and other features are described in more detail herein.

BRIEF DESCRIPTION OF THE DRAWING FIGURES

Figure 2:
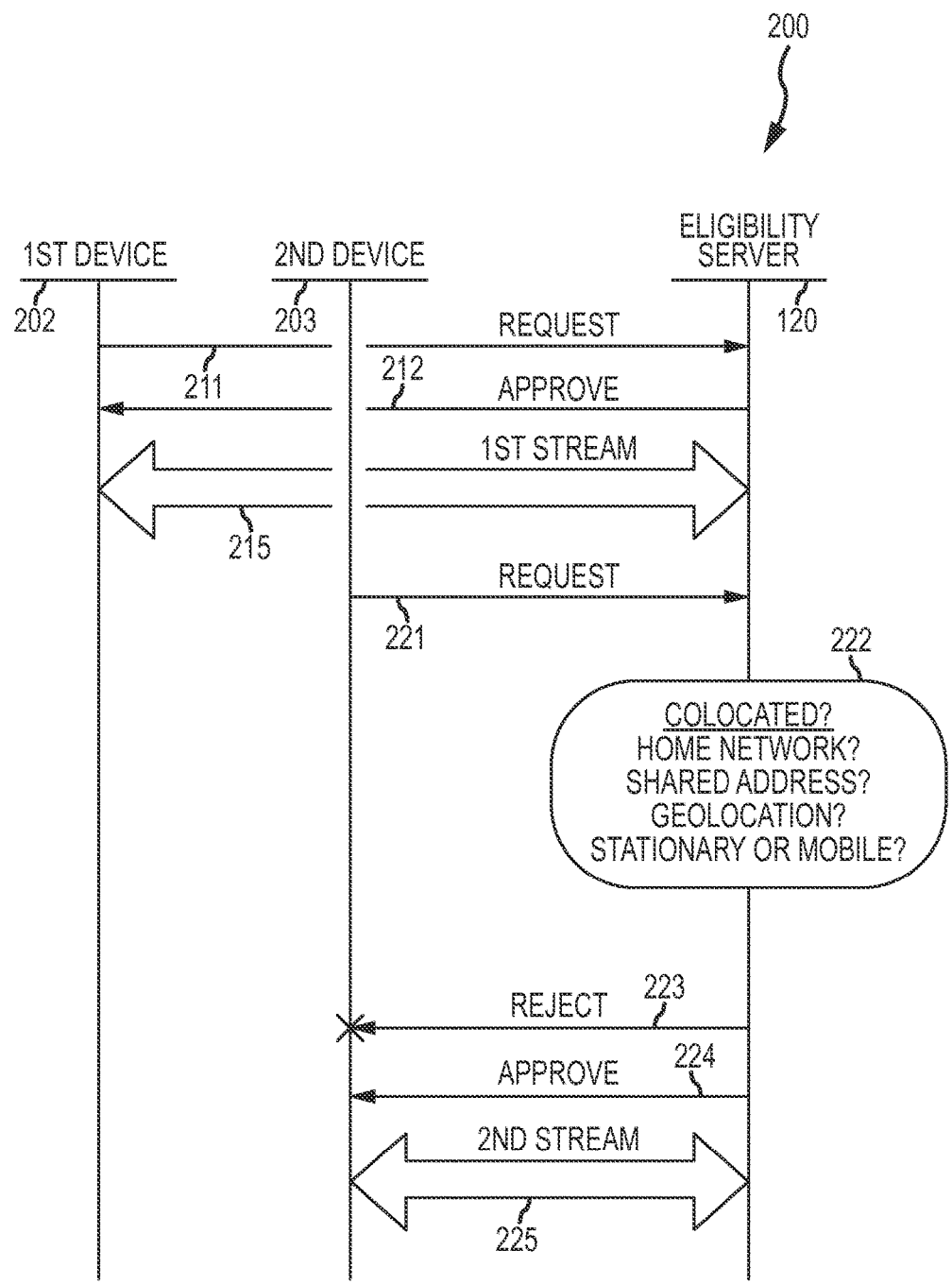
Figure 3:
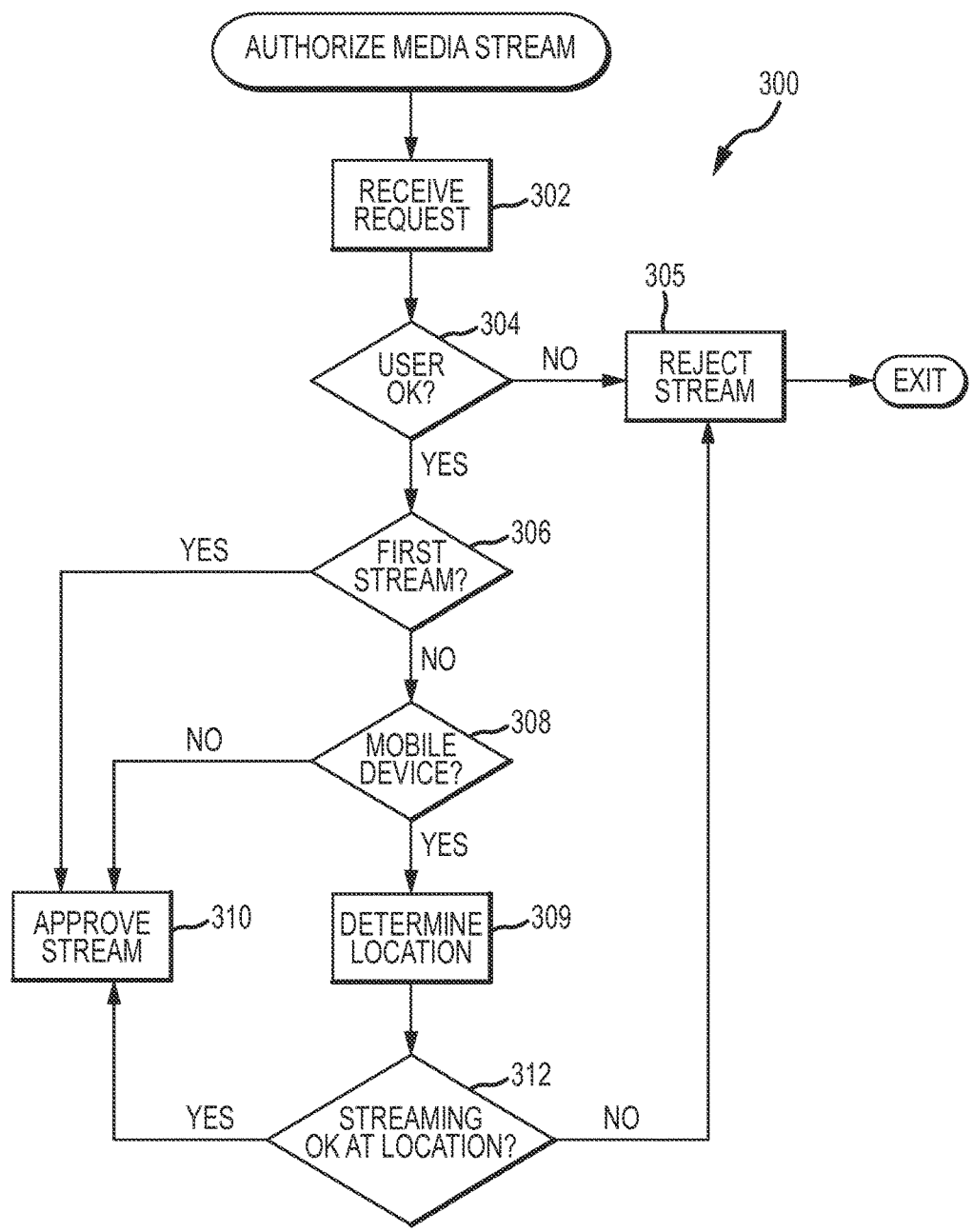

Exemplary embodiments will hereinafter be described in conjunction with the following drawing figures, wherein like numerals denote like elements, and FIG. 1 is a block diagram of an exemplary system for determining eligibility to receive simultaneous media streams at client devices;

FIG. 2 is a message flow diagram showing an exemplary process for determining eligibility to receive simultaneous media streams at client devices; and FIG. 3 is a flowchart of an exemplary process for determining eligibility to receive simultaneous media streams at client devices.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, mobility factors relating to the receiving devices themselves are used to determine eligibility to receive multiple simultaneous media streams. Mobility factors may include the type of device (e.g., mobile or stationary device), the device's local or wide area network address, and/or any other information that provides information about a geographic location of the device.

If the geographic location of the device can be determined with at least some particularity, then the authorization system can apply business rules to grant or deny access to particular media streams. Business rules could dictate that certain content is limited to viewing at a home location only, for example, or that the number of streams provided to viewers in different locations can be restricted to prevent password sharing or other forms of abuse. Various business rules can be combined in any manner. Multiple simultaneous streams could be allowed into a home, for example, while only a single stream is allowed to a mobile device or other location away from the home. Any number of other business rules or other approval schemes could be supplemented or equivalently used, and several examples are described in more detail below.

Turning now to the drawing figures and with initial reference to FIG. 1, an exemplary authorization system 101 suitably includes a computer system 120 that grants or denies access to media streams provided on a network 115 based upon mobility factors, as described more fully herein. In some implementations, access is granted or denied in accordance with business rules 128 that govern media streams provided to certain locations. Multiple media streams may be allowed into home environment 102, for example, even if the streams are being played by different devices 105-108. Business rules 128 may also limit or restrict media streams that are provided outside of home environment 102. If a mobile phone 105, computer 106 or other device leaves environment 102 and connects to network 115 in another manner, then this change in location can be identified and addressed accordingly.

Computer system 120 is any sort of server or other computer capable of communicating on network 115. Computer system 120 typically includes a conventional processor 121, memory 122 and input/output interfaces 123 to support data processing and the other functions described herein. In a typical implementation, processor 121 executes a software program 124 that resides memory 122. Equivalent embodiments may execute multiple copies of software program 124 using shared computing hardware, as in a "cloud" server or the like.

In the exemplary embodiment illustrated in FIG. 1, software program 124 includes appropriate modules, routines and/or other processing logic 129 to receive requests for media streams from devices 105-108, to process mobility information 127 about the device requesting the media stream, and to apply appropriate business rules 128 in granting or denying access to the stream as appropriate. Mobility information 127 may relate to the network address of the requesting device, a global positioning system (GPS) or other report of the requesting device's location, the type of device (e.g., stationary or mobile) requesting the stream, or any other information as appropriate. In some embodiments, system 120 may consult a geo-location database 126 or similar service that is able to identify the geographic location of the requesting device based upon the IP or other network address of the requesting device. Computer server 120 may also consider an account database 125 to authenticate users based upon userid/password data, biometric data, or any other digital credentials. Account database 125 may be hosted by a separate computing system other than system 120, as appropriate. FIGS. 2 and 3 below provide additional information about several exemplary processes for determining eligibility to receive media streams.

The media streams that are provided to the various client devices 105-108 may emanate from any number of servers or other sources on network 115. In various embodiments, a content delivery network (CDN) or media server 130 provides streaming content using any open or proprietary formats. Examples of applications that may make use of the media streaming authorization techniques described herein include IPTV, RSDVRs, video on demand (VOD), place-shifting and/or the like. In a typical implementation, authorization server 120 will process stream requests received from different user devices 105-108 and will then notify the media streaming host 130 when streams are approved. Other embodiments may combine some or all of the functions of authorization server 120 and media host 130 as desired.

Many families now operate numerous devices 105-108 that are capable of processing media streams. FIG. 1 shows a user's home environment 102 to include multiple devices 105-108 that communicate using network 115. Devices that are capable of receiving media streams could include, without limitation, mobile telephones 105, computer systems 106 (such as personal, laptop, tablet or other PCs), set top boxes or other television receivers 107, dedicated media players 108, and/or the like. Typically, a user operates any device 105-108 to request a streaming media connection from server 130. As noted above, the application executing on the requesting device 105-108 may be a placeshifting application, an application to obtain IPTV content or video on demand, an RSDVR application, or any other application that obtains media streams for playback to the user.

FIG. 1 shows home environment 102 to include all of the devices 105-108 logically residing behind a router 104. Router 104 may be any sort of network bridge, router, repeater, gateway or other device that provides access to network 115. A conventional router 104, for example, may provide packet routing, access control, security and other functions associated with communications between a local area network (LAN) no and a wide area network (WAN) such as network 115. Although the home environment 102 illustrated in FIG. 1 includes only a single LAN 110, in practice the home environment 102 may include any number of wired and/or wireless LANs that typically operate within the geographic proximity of a home, office or other structure and that are generally under the control of a single user, family or operator. A single family or business entity, for example, typically retains control of the router 104 and other computing hardware operating within home environment 102. The home environment 102, then, can be a good indicator of devices 104-108 that are owned or operated by the same user. Put another way, devices 104-108 that are known to operate within the same home environment 102 can generally be assumed to be under the control of the same legitimate user. As devices 105, 106 move away from the home environment 102, however, then security concerns can be increased and/or access to media streams can be restricted.

Network 115 is any sort of communications network that allows delivery of streaming media using a client/server or other communications model. Network 115 could represent the Internet, for example, or any other public or private data communications network, including a telephone network. In the example of FIG. 1, network 115 is accessible via any number of access points, such as via a cellular or other mobile phone connection 118, a wireless or other network connection 117, and/or the like. Devices 104-108 and servers 120, 130 may connect to network 115 in any conventional manner using appropriate hardware, software, wired or wireless interfaces, signaling protocols and the like.

As noted above, authorization server 120 grants or denies access to media streams based at least in part upon mobility factors 127 of the device 105-108 requesting the stream. Mobility factors 127 may include, for example, the network address of the requesting device, the actual physical location of the requesting device, the mobile or stationary nature of the device, or any other factors as appropriate. The location of the requesting device may be used in any manner, as defined by business rules 128. Devices 105-108 operating within home environment 102, for example, may be approved for additional media streaming even though other concurrent media streams may be simultaneously provided to other devices. As a mobile device (e.g., mobile phone 105 or a mobile computer 106) moves away from the home environment 102, however, additional restrictions can be imposed in accordance with business rules 128. Various techniques for granting and denying access to concurrent video streams are described below.

FIG. 2 shows an exemplary process 200 to grant or deny access to multiple simultaneous media streams using geographic or other mobility information. In the illustrated example, two user devices 202 and 203 request access to media streams 215 and 225, respectively, from eligibility server 120. Each of the user devices 202, 203 generally corresponds to any of the user devices 105-108 described above in conjunction with FIG. 1.

As shown in FIG. 2, the first user device 202 is able to request 211 and receive approval 212 for a first stream 215 from eligibility server 120 as appropriate. Typically, the user device 202 will interact with the eligibility server 120 to authenticate the user as a valid account holder and to identify the particular content stream that is requested. The stream can be approved or rejected in accordance with the various business rules 128 and/or any other factors, as appropriate. FIG. 2 illustrates an example wherein the first stream is generally accepted regardless of the position of the requesting device 202. Other embodiments may use different business rules 128 or other criteria for evaluating and approving either or both of the two streams 215, 225 as desired.

When a second request 221 is received from a second user device 203, then the eligibility server 120 appropriately determines whether the second stream 223 should be approved or rejected based upon the geographic location or other mobility factors relating to the requesting second device 203. In some embodiments, the eligibility server 120 suitably determines if the first user device 202 and the second user device 203 are co-located.

Co-location can be determined in any manner. If the device 203 is determined to be communicating from the user's home network 110, for example, then the device 203 can be assumed to be in a home location where multiple media streams are allowed. The device 203 can be determined to be on a home network if the device 203 has the same effective network address (e.g., IP address on network 115) as the first user device 202, thereby indicating that both the first and second devices are operating behind a common router 104. Similarly, if a requesting device 203 has a network address that matches the address of a set top box 107 or other stationary device that is known to be at the home location, then the device 203 can be considered to be in the home location. Other embodiments could receive a verification from a STB 107 or other device known to be operating on the home network 110 that indicates that the requesting device 203 is also located on the home network 110. If the STB 107 is able to communicate with the device 203 using non-routable messages, for example, then the STB 107 could report back to eligibility server 120 that the requesting device 203 is a home network device that is eligible to receive simultaneous streams. Still other embodiments could approve the stream 225 if the requesting device 203 is known to be a stationary device (e.g., a television, a television receiver, a desktop computer, etc.) rather than a mobile device (e.g., a mobile phone, tablet computer or the like). Multiple simultaneous streams could be allowed to televisions, stationary media players and other household devices, for example, while restricting or limiting streams that are provided to mobile devices.

Note that some devices 203 could act as "home" devices at some times and as "mobile" devices at other times. A mobile phone, for example, may act as a node on home network 110 when the user is at home and connected via a Wifi or similar connection. The same phone, however, may be a mobile node when the user is accessing the network 115 via a wireless telephone connection 118. One way to discern between these two instances would be to consider the network address used by the mobile phone. In the case where the phone is communicating via the home network 110, then the device's IP or other address on network 115 should be the same (or very similar) as other devices operating behind router 104. That is, all devices operating behind router 104 will typically share an address associated with interface 119. This common network address can be used to approve concurrent streaming connections to multiple devices.

Other co-location techniques could consider the actual geographic location of the requesting device 203 as appropriate. Even if the network addresses of the two requesting devices 202 and 203 do not match, for example, they may still indicate close geographic proximity based upon geolocation data found in database 126. That is, if both devices 202 and 203 are using IP or other network addresses that are known to be associated with the same geographic area or that are known to be associated with the same geographic area (e.g., ZIP code) of the user's known home address, then co-location can be assumed with some level of reliability. In still other embodiments, the device could report geographic location information obtained from GPS, Wifi zone recognition, cellular network location and/or other techniques.

Again, the eligibility sever 120 evaluates the location information in view of the applicable business rules 128 to approve or reject the requested media stream. If the requesting device 203 is not in a location where streaming is allowed, then the stream is rejected (function 223) as appropriate. Conversely, if streaming is allowed, then the stream is approved (function 224) so that the device 203 can receive the requested media stream 225. As noted above, the eligibility server 120 may not deliver the stream 225 directly, as shown in FIG. 2, but may equivalently approve the stream 225 to be delivered from a separate server operating on network 115 or elsewhere.

FIG. 3 shows an exemplary process 300 to authorize concurrent media streams. Process 300 may be implemented in whole or in part with software instructions that could be stored in memory 122 or elsewhere in eligibility server 120, and that can be executed by processor 122 as appropriate. Equivalent embodiments may use other processing resources (such as cloud processing resources) to implement the various functions shown in the figure.

With reference now to FIG. 3, an exemplary process 300 suitably begins when a request for a media stream is received at the eligibility server 120 (function 302). This request may correspond to either of the requests 211 or 221 shown in FIG. 2.

Typically, the eligibility server 120 will initially authenticate the requesting user to verify that the user is a valid account holder, or is otherwise authorized of receive media streams within system 100 (function 304). This authentication may involve verifying a userid/password, biometric data, stored cookie data, or other digital credential provided by the requesting user device. In some implementations, the user provides a userid/password that is verified against information in account database 125 to ensure that the user is a valid account holder. If the user is not valid, then streaming is typically rejected outright (function 305).

If the user is valid, then the eligibility server 120 suitably applies the appropriate business rules 128 to approve or reject stream requests. In the example of FIG. 3, the first stream request is approved regardless of the location of the requesting device (functions 306, 310). Other embodiments may still consider the location of the first requesting device so that subsequent requests from mobile devices are not improperly rejected; other business rules and approval/rejection scenarios could be applied in any number of equivalent embodiments.

Continuing the example of FIG. 3, if the request is not the first simultaneous stream (function 306), then the eligibility server 120 suitably determines whether the requesting device is stationary or mobile (function 308). In this example, requests from stationary devices (e.g., televisions, television receivers, stationary media players, etc.) are approved (function 310) while requests from mobile devices undergo further evaluation. Again, equivalent embodiments could apply different logic or evaluation criteria as desired.

If the requesting device is a mobile device, then the location of the device is considered (function 309). If the mobile device is located at home or another location where streaming is approved (function 312), then the stream is approved 310. As noted previously, streaming to a mobile device may also be allowed if the device is currently connected to a home network 110, if the content requested is not limited, and/or if the user is not currently using all of the available mobile streams, as dictated by business rules 128.

The various concepts, systems, structures and techniques described herein may be enhanced or otherwise modified in any manner. The general concept of geographic approval of media streaming, for example, could be used to restrict streams sent to mobile users who may be travelling to places where streaming is not desired or allowed. Content restrictions could prevent streaming of certain content to foreign countries, for example, or streaming of content to locations where the content is not otherwise available. A user who lives in the Eastern time zone of the United States, for example, may be prevented from streaming live programming to locations in the western United States until that programming has been broadcast to those time zones.

Further embodiments could apply different restrictions on media streaming to different types of program content. Some implementations could allow relatively open streaming of some content while restricting streaming of premium or specialized content. Still other implementations could apply different business rules for different content producers or distributors; certain networks may have different restrictions on their content than other networks, for example, and eligibility server 120 could consider the source or type of content in applying business rules 128 and/or otherwise approving requests for streaming media.

Many other modifications and enhancements could be provided in a wide array of alternate but equivalent embodiments.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A method executable by a computer system to authorize access to a simultaneous second media stream with a second client device that is a mobile device currently located at a second geographic location after a previously-approved media stream has already been established to a first client device that is different from the second client device at a first geographic location, the method comprising:
   receiving a request at the computer system to establish the simultaneous second media stream with the second client device via a mobile telephone network, wherein the request comprises a second network address of the second client device that uniquely identifies the second device on the mobile telephone network and wherein the request is received after the previously-approved media stream has been initiated with the first client device that is different from the second client device via a wired network that is different from the mobile telephone network, wherein the first client device has a first network address that uniquely identifies the first device on the wired network;
   determining, by the computer system, whether the first and second client devices are both located in the same geographic location, wherein the determining comprises providing the first and second network addresses from the wired network and the mobile telephone network, respectively, to a geographic database and receiving in response information identifying the first geographic location of the first client device and the second geographic location of the second client device based upon the first and second network addresses, respectively; and if the second client device is located at the same geographic location as the first client device, the computer system granting the second client device access to the simultaneous second media stream via the mobile telephone network that is different from the wired network and otherwise denying the simultaneous second media stream via the mobile telephone network, wherein the access to the simultaneous second media stream is granted if the first and second geographic locations match even though the first network address and the second network address indicate that the first and second devices are operating on different networks.

2. The method of claim 1 wherein the simultaneous second media stream is authorized if the geographic locations of the first and second client devices are determined based upon data from the geolocation database to be within a threshold distance of each other.

3. The method of claim 1 wherein the simultaneous second media stream is authorized if the geographic locations of the first and second client devices are within a threshold distance of each other even though the network addresses used by the first and second client devices are different.

4. The method of claim 1 wherein the first and second client devices are determined to operate at the same geographic location if the first network address is determined to be operating within a predetermined distance from the second network address.

5. The method of claim 1 wherein the request identifies a type of the second client device, and wherein the determining considers the type of the second client device.

6. A computer system to authorize access to a simultaneous second media stream with a second client device with a second network address on a mobile telephone network after a previously-approved media stream has been established via a wired network with a first client device operating with a first network address on the wired network, the computer system comprising:

an interface to a network;

a processor configured to receive a request to establish the simultaneous second media stream with the second client device via the mobile telephone network, to determine whether the second client device is located at the same geographic location as the first client device that is receiving the previously-approved media stream, and, if the second client device is located at the same geographic location as the first device, to grant the second client device access to the simultaneous second media stream via the mobile telephone network and to otherwise deny the second client device access to the simultaneous second media stream, wherein the mobile telephone network is a different network than the wired network, and wherein the first and second network addresses identify the first device on the wired network and the second client device on the mobile telephone network, respectively; and a geolocation database stored on a digital storage medium, wherein the geolocation database is configured to receive the first and second network addresses from the processor and to responsively provide the geographic locations of the first and second client devices to the processor based upon the first and second network addresses used by the first and second client devices, respectively;

wherein the processor grants the second client device access to the simultaneous second media stream via the mobile telephone network if the first and second geographic locations match even though the first network address and the second network address indicate that the first and second devices are operating on different networks.

7. The computer system of claim 6 further comprising an account database that comprises data associated with each of a plurality of users, wherein the processor is further configured to query the account database to verify that the first and second devices are associated with a same one of the plurality of users.

8. A method executable by a computer system to authorize access to simultaneous media streams by a user, the method comprising:

receiving a first request via a wired network to establish a first media stream with a first client device associated with the user;

obtaining a first geographic location of the first client device from a geolocation database available to the computer system based upon a first network address on the wired network that is contained in the first request and that uniquely identifies the first client device;

authorizing the first media connection via the wired network with the first client device;

after authorizing the first media connection, receiving a second request to establish a simultaneous second media stream via a mobile telephone network with a second client device associated with the user, wherein the wired network and the mobile telephone network are different networks;

obtaining a second geographic location of the second client device from the geolocation database based upon a second network address on the mobile telephone network that uniquely identifies the second client device and that is contained in the second request; and if the first and second geographic locations indicate that the second client device is located at the same geographic location as the first client device that is receiving the previously-authorized first media connection, granting the second client device access to the simultaneous second media stream via the mobile telephone network and otherwise denying the second client device access to the simultaneous second media stream, wherein the access is granted if the first and second geographic locations match even though the first network address and the second network address indicate that the first and second devices are operating on different networks.

9. The method of claim 8 wherein the second request comprises an indication of a device type, and wherein the access is granted if the second client device is a stationary device and denied if the second client device is a mobile device.

10. The method of claim 8 wherein the second request comprises an indication of a device type, wherein the access is granted if the second client device is a stationary device, and wherein the access is denied if the second client device is a mobile device unless the second device is located at the same geographic location as the first device.

11. The method of claim 8 wherein the granting comprises allowing multiple simultaneous media streams to devices that are located at the user's home location while only allowing a single media stream to devices that are not located at the user's home location.

12. The method of claim 8 further comprising determining whether the second media stream contains restricted media content, and wherein the determining comprises allowing multiple simultaneous media streams of unrestricted media content while only allowing a single stream of restricted media content to client devices that are not located at the user's home location.

\* \* \* \* \*